UNITED STATES PATENT OFFICE.

HYLEMAN ALISON WEBSTER, OF COLUMBIA, TENNESSEE.

PROCESS OF CONCENTRATING PHOSPHATIC MATERIAL.

1,266,730.  Specification of Letters Patent.  Patented May 21, 1918.

No Drawing. Application filed June 4, 1917. Serial No. 172,778.

*To all whom it may concern:*

Be it known that I, HYLEMAN ALISON WEBSTER, a citizen of the United States, residing at Columbia, in the county of Maury and State of Tennessee, have invented certain new and useful Improvements in Processes of Concentrating Phosphatic Material; and I do hereby declare the following to be a full, clear, and exact description of the invention, such as will enable others skilled in the art to which it appertains to make and use the same.

This invention relates to a process of recovering tricalcium phosphate from phosphatic limestone, and has for its object to effect this recovery in a manner more expeditious and less costly than has been heretofore proposed.

With this and other objects in view the invention consists in the novel steps and combinations of steps constituting the process all as will be more fully hereinafter disclosed and particularly pointed out in the claims.

In order that the invention may be the more clearly understood it is said:—In middle Tennessee and elsewhere there are very large deposits of limestone containing tricalcium phosphate and calcium carbonate in the proportions of say from 20% to 50% tricalcium phosphate and from say 40% to 70% calcium carbonate. But the content of phosphorus is relatively so low and the cost of obtaining it by the methods heretofore proposed has been so high, that these phosphatic limestones are at present regarded as of too low a grade to be of any value as a source of phosphorus, and therefore, they at present can be had at merely nominal prices. Accordingly, any process that successfully extracts this said phosphorus will not be burdened with a high cost of the raw material.

In carrying out this process, I first burn the phosphatic limestone in any suitable kiln until its calcium carbonate constituent is substantially deprived of its carbon dioxid $CO_2$ and is converted into calcium oxid $CaO$. The tricalcium phosphate present in the rock is not chemically affected by this heat treatment and the resulting product is found to consist of a mixture of calcium oxid and unchanged shelly remains of minute mollusks carrying a very high percentage of tricalcium phosphate. The calcium oxid thus formed is further found to be in a very much finer state of subdivision than is this said phosphatic material, or it can be easily brought into such a state by suitably crushing or grinding the burnt rock.

Accordingly, the said burnt rock is next suitably crushed or ground and the finely divided mixture of lime and phosphatic material may be passed through a sieve to separate out a portion of the phosphatic material, and the remaining particles of crushed material may then be permitted to fall under action of gravity while an air current is blown across their path of travel. Or in some cases the sifting operation may be dispensed with and the separation effected by air currents alone. In either case the falling calcium oxid particles are blown to one side and may be collected in suitable bins, while the phosphatic particles being heavier than the particles of lime are not so much deflected and may therefore be caught in separate bins.

By this process of dry separation, I am enabled to save the lime as a by-product and it of course lessens the total cost of the process of separation.

Instead of effecting the separation of the phosphatic material from the lime in a dry way, I may employ a wet method consisting in treating the finely divided rock material with water to slake the lime present, and then passing the treated mass rapidly through water to float off the lighter particles of hydrated lime in the form of suspended matter. A traveling conveyer carrying the finely divided slaked mass and passing through successive tanks containing water is found to be effective. Even tanks filled with water into which the slaked material is introduced are found to be effective, for upon stirring the ground mass and rapidly drawing off the water, a large percentage of the lime comes to the surface and may be carried off while the phosphatic material settles to the bottom.

In either of the above methods of separation a mass very rich in tricalcium phosphate is obtained which can be treated by well known methods well within commercial limits of cost for the recovery of the combined phosphorus. When a wet method of separation is employed the water containing the lime hydrate may be suitably collected and its contents utilized in other industries.

It will now be clear that by following the above procedure of first driving off the carbonic acid of the calcium carbonate and leaving unchanged the tricalcium phosphate present in the rock, I am enabled with the aid of gravity in all cases to effect a mechanical concentration of the phosphate material by suspending the same in a fluid such as air or water and permitting the heavier phosphatic particles to settle while the lighter lime particles are carried away. I thus do away with the necessity of employing chemicals or resorting to other costly expedients.

It is obvious that those skilled in the art may vary the details of the process without departing from the spirit of the invention and therefore I do not wish to be limited to the above disclosure except as may be required by the claims.

What I claim is:—

1. The process of concentrating the phosphatic material contained in low grade phosphatic limestones which consists in heating said limestones until a substantial portion of the carbon dioxid present has been driven off; finely dividing the burnt rock thus obtained; and suspending the finely divided mass in a moving fluid to carry away the lighter phosphorus free particles and to permit the heavier phosphatic particles to settle, substantially as described.

2. The process of separating out the phosphatic material in phosphatic limestone rock which consists in burning said rock to convert its contained calcium carbonate into calcium oxid; finely dividing said burnt rock thereby forming a mixture containing particles of calcium oxid and tricalcium phosphate; and floating said particles on moving air currents to carry away the lighter calcium oxid particles and to permit the heavier tricalcium phosphate particles to settle, substantially as described.

3. The process of separating out the phosphatic material in phosphatic limestone rock which consists in burning said rock to convert its contained calcium carbonate into calcium oxid; finely dividing said burnt rock thereby forming a mixture containing particles of calcium oxid and tricalcium phosphate; passing said mixture through a sieve to partially separate out the larger phosphatic particles; and floating the remainder of said particles on moving air currents to carry away the lighter calcium oxid particles and to permit the heavier tricalcium phosphate particles to settle, substantially as described.

In testimony whereof I affix my signature, in presence of two witnesses.

HYLEMAN ALISON WEBSTER.

Witnesses:
C. J. AKINS,
L. B. HUGHES.